US012594215B2

(12) United States Patent
Witt

(10) Patent No.: US 12,594,215 B2
(45) **Date of Patent: *Apr. 7, 2026**

(54) COMPRESSION WAVE MASSAGE DEVICE

(71) Applicant: EIS GmbH, Bielefeld (DE)

(72) Inventor: Florian M. Witt, Wentorf (DE)

(73) Assignee: EIS GmbH, Bielefeld (DE)

( * ) Notice: Subject to any disclaimer, the term of this patent is extended or adjusted under 35 U.S.C. 154(b) by 906 days.

This patent is subject to a terminal disclaimer.

(21) Appl. No.: 17/719,802

(22) Filed: Apr. 13, 2022

(65) Prior Publication Data

US 2022/0233395 A1 Jul. 28, 2022

Related U.S. Application Data

(62) Division of application No. 15/260,947, filed on Sep. 9, 2016, now Pat. No. 11,484,463.

(30) Foreign Application Priority Data

Apr. 4, 2016 (DE) ........................ 102016106120.4
May 12, 2016 (EP) .................................... 16169444

(51) Int. Cl.
*A61H 19/00* (2006.01)
*A61H 9/00* (2006.01)

(52) U.S. Cl.
CPC ........... *A61H 19/34* (2013.01); *A61H 9/0007* (2013.01); *A61H 9/005* (2013.01); *A61H 9/0057* (2013.01);

(Continued)

(58) Field of Classification Search
CPC ...... A61H 19/34; A61H 7/008; A61H 9/0057; A61H 2009/0064

(Continued)

(56) References Cited

U.S. PATENT DOCUMENTS 1,042,058 A 10/1912 Hook
1,730,535 A 10/1929 Rudolph (Continued)

FOREIGN PATENT DOCUMENTS

CH 329193 A 10/1958
CN 2153351 Y 1/1994

(Continued)

OTHER PUBLICATIONS

Translation of FR 2999075-A1. (Year: 2014).*

*Primary Examiner* — Paige Kathleen Bugg
(74) *Attorney, Agent, or Firm* — Bookoff McAndrews, PLLC

(57) ABSTRACT

A compression wave massage device for body parts is described, particularly for erogenous zones such as the clitoris, comprising a pressure field generation device and a drive device. The pressure field generation device has at least one cavity with a first end and a second end, located opposite the first end and distanced from said first end, with the first end being provided with at least one opening for placement on a body part. The drive device causes a change of the volume of at least one cavity between a minimal volume and a maximal volume such that in at least one opening a stimulating pressure field is generated. The cavity is formed by a single chamber, and the ratio of the volume change to the minimal volume is not below 1/10, preferably not below 1/8.

21 Claims, 5 Drawing Sheets

(52) U.S. Cl.
CPC ..... *A61H 19/30* (2013.01); *A61H 2201/0153* (2013.01); *A61H 2201/0157* (2013.01); *A61H 2201/1207* (2013.01); *A61H 2201/1215* (2013.01)

(58) Field of Classification Search
USPC ................................................ 601/9; 600/38
See application file for complete search history.

(56) References Cited

U.S. PATENT DOCUMENTS

| | | | | |
|---|---|---|---|---|
| 1,882,040 | A | 10/1932 | Roehm | |
| 3,818,904 | A | 6/1974 | Kawada | |
| 5,377,701 | A | 1/1995 | Fang | |
| 5,693,002 | A * | 12/1997 | Tucker | A61H 19/30 600/38 |
| 6,099,463 | A | 8/2000 | Hockhalter | |
| 6,464,653 | B1 | 10/2002 | Hovland et al. | |
| 6,733,438 | B1 | 5/2004 | Dann et al. | |
| 7,670,280 | B2 | 3/2010 | Gloth | |
| 8,273,037 | B2 * | 9/2012 | Kreindel | A61M 1/75 601/9 |
| 8,784,297 | B2 | 7/2014 | Mertens et al. | |
| 11,484,463 | B2 * | 11/2022 | Witt | A61H 9/0057 |
| 2004/0102822 | A1 | 5/2004 | Cohn | |
| 2005/0203446 | A1 | 9/2005 | Takashima | |
| 2008/0275386 | A1 | 11/2008 | Myers | |
| 2008/0304984 | A1 | 12/2008 | Chan | |
| 2009/0299234 | A1 * | 12/2009 | Cho | A61H 9/0057 601/2 |
| 2010/0106064 | A1 | 4/2010 | Kreindel et al. | |
| 2010/0298745 | A1 * | 11/2010 | Liu | A61H 9/0057 601/12 |
| 2016/0213557 | A1 * | 7/2016 | Lenke | A61H 19/00 |
| 2019/0083354 | A1 * | 3/2019 | Pahl | A61H 9/005 |

FOREIGN PATENT DOCUMENTS

| | | | | |
|---|---|---|---|---|
| DE | 124218 | A | 11/1900 | |
| DE | 278733 | A | 8/1912 | |
| DE | 9309994 | U1 | 10/1993 | |
| DE | 20112384 | U1 | 10/2001 | |
| DE | 202005004843 | U1 | 8/2005 | |
| DE | 202012005414 | U1 | 8/2012 | |
| DE | 102013110501 | A1 | 3/2015 | |
| EP | 0365230 | A2 | 4/1990 | |
| FR | 2746639 | A1 | 10/1997 | |
| FR | 2999075 | A1 * | 6/2014 | A61H 7/008 |
| JP | 2011-083423 | A | 4/2011 | |
| WO | 2006/058291 | A2 | 6/2006 | |
| WO | 2013/178223 | A2 | 12/2013 | |
| WO | 2014/081600 | A1 | 5/2014 | |
| WO | 2014/085736 | A1 | 6/2014 | |
| WO | 2015/039787 | A1 | 3/2015 | |

* cited by examiner

COMPRESSION WAVE MASSAGE DEVICE

STATEMENT OF RELATED APPLICATIONS

This application is a divisional of U.S. Non-Provisional application Ser. No. 15/260,947, filed Sep. 9, 2016 (still pending). This application and the '947 application claim priority to and the benefit of German Patent Application No. 102 016 106 120.4, filed Apr. 4, 2016, and European Patent Application No. 16 169 444.3, filed May 12, 2016.

TECHNICAL FIELD

The invention relates to a compression wave massage device for body parts, particularly erogenous zones such as the clitoris, comprising a device generating a pressure field, which shows at least one cavity with a first end and a second end, located opposite thereto and distanced from the first end, with the first end comprising at least one opening for placement on a body part and a drive device, which is embodied to generate a change of the volume of at least one cavity between a minimal volume and a maximal volume such that a stimulating pressure field is generated in at least one opening.

BACKGROUND

A device of the type mentioned at the outset is particularly known from DE 10 2013 110 501 A1. In this known device the cavity is formed by a first chamber and a second chamber. The second chamber shows an opening for placement on a body part or on an erogenous zone. The two chambers are connected to each other via a narrow connection channel. The drive device is embodied such that it only changes the volume of the first chamber, namely such that via the connection channel a stimulating pressure field is generated in the second chamber. This construction of prior art shows considerable disadvantages, though. The use with gliding gel or under water is impossible, since the lubricant or the water increases the throttle effect in the narrow connection channel to such an extent that the drive device is choked off. Additionally, the device of prior art fails to comply with the strict requirements of hygiene required here, since the connection channel due to its very narrow cross-section prevents any cleaning of the first chamber located at the inside so that contaminants and bacteria can accumulate there, which then cannot be removed.

The objective of the present invention is to provide a compression wave massage device of the type mentioned at the outset which shows a simple and simultaneously effective design, and additionally meets the strict requirements for hygiene.

SUMMARY

This objective is attained in a pressure field generation device, which comprises at least one cavity with a first end and an opposite second end, located at a distance from the first end, with the first end comprising at least one opening for placement on a body part and a drive device, which is embodied to change the volume of at least one cavity between a minimal volume and a maximal volume such that a stimulating pressure field is generated in at least one opening, characterized in that the cavity is formed by a single chamber and the ratio of volume change to minimal volume is not below $1/10$, preferably not below $1/8$.

Accordingly, the invention is characterized in a single-chamber solution, which shows the advantages of a simpler construction, improved hygiene, particularly due to the ability of easier rinsing of the cavity according to the invention, formed by only a single chamber, and the easy handling with lubricant or under water.

Furthermore, according to the invention the ratio of the minimal volume to the volume change shall not exceed 10, particularly not exceed 8, since it was found that otherwise the suction effect becomes too low. Here, the volume change refers to the difference between the maximal volume and the minimal volume. The volume of the cavity is defined as the volume of a chamber which ends in the proximity of the opening in a virtually planar area, which virtually closes the opening.

Preferred embodiments and further developments of the invention are disclosed in the dependent claims.

Preferably the ratio of minimal volume to volume change should not be below 1, and preferably not below 2, since according to the invention it was found that otherwise the required power of the drive device becomes excessive and on the other hand the vacuum at the opening becomes too strong and perhaps even painful.

When using a flexible membrane, to be set into a reciprocal motion by the drive device, for the alternating generation of vacuum and pressure, here the minimal volume of the cavity is defined as the volume when the opening of the cavity is virtually closed with a planar area and the membrane is in an operating stage and/or a position with the shortest distance from the opening.

On the other hand, the maximal volume of the cavity of the chamber is defined as the volume when the opening of the cavity is virtually closed with a planar area and the membrane is in an operating stage and/or a position showing the greatest distance from the opening. In order for the air flow to remain essentially unchanged over the entire length of the cavity of the chamber or to be at least almost consistent, preferably the cross-section of the cavity of the chamber, defined perpendicular to the length between its two ends, should be unchanged or at least almost constant over the entire length between its two ends. The cross-section is preferably understood as defining the cross-sectional shape and/or the cross-sectional area.

The cavity of the chamber can preferably show essentially the form of a rotary body with a circular or elliptic cross-section.

Additionally, for generating a homogenous, unhindered and thus effective airflow it is advantageous when preferably the side wall of the camber, limiting the cavity and connecting its two ends to each other, is free from discontinuous sections.

Beneficially the cavity of the chamber may show the form of a continuous tube.

Preferably the cross-section of the opening is essentially equivalent to the cross-section of the cavity of the chamber.

It has proven particularly advantageous to size the ratio of the width of the cavity of the chamber, defined perpendicular to its longitudinal extension, to the length of the cavity of the chamber, defined in the direction of its longitudinal extension, from 0.1 to 1.0, preferably from 0.2 to 0.6, particularly preferred from 0.38 to 0.4.

Preferably the cavity of the chamber is closed at its inner, second end with a flexible membrane which extends essentially over the entire cross-section of the cavity and is moved by the drive device alternating in the direction towards the opening and the direction opposite thereto. With such a construction the stimulating pressure field can be generated in a particularly simple and simultaneously effective fashion in the cavity of the single chamber provided according to the invention.

For reasons of hygiene, it is further advantageous if particularly the section of the chamber showing the opening is provided as an interchangeable socket, with its inner lateral wall forming a section of the lateral wall of the cavity leading towards the opening. Beneficially the socket should be made from a flexible material, preferably silicon.

In a further development of the preferred embodiment stated above the inner lateral wall of the socket should essentially be aligned to the other section of the lateral wall of the cavity such that any points of discontinuation between the socket and the inner section of the cavity of the chamber is avoided.

In an alternative further development of the above-stated preferred embodiment the inner lateral wall of the socket forms an essentially continuous lateral wall of the cavity, connecting the first end with the second end, and thus a lateral wall of the cavity connecting the opening of the socket with the membrane, and the socket together with the membrane form a one-piece component. Such a preferred further development offers, based on the one-piece connection of the socket and the membrane, a particularly easily produced design and additionally has advantages with regards to hygiene, because the entire component comprising membrane and socket can be exchanged, which is possible only with the one-chamber solution realized according to the invention.

Preferably the pressure field shall show a pattern of relative vacuum and pressure stages, which are modulated upon a reference pressure, preferably normal pressure. Beneficially the value of the overpressure in reference to normal pressure is lower than the value of the relative vacuum in reference to normal pressure, and measures preferably no more than 10% of the value of the relative vacuum. It has been found that under normal conditions of use, when the compression wave massage device, placed with its opening on the body part to be stimulated, is not impinged by excessive compression, potentially developing relative overpressure can largely dissipate so that already for this rather factual considerations, the focus must be given to a pressure field to be modulated primarily in the vacuum range. For this reason, it is alternatively also possible that the pressure field comprises a pattern of only relative vacuum stages, which are modulated on a reference pressure, for example normal pressure. In another preferred further development the pressure field is generated with an essentially sinusoidal periodic pressure progression, with the drive device here being required to cause a regular change of the volume of the cavity, for example with the help of an eccentric mechanism.

Preferably a control device may be provided, which controls the drive device and shows at least one control means by which the respective modulation of the pressure field can be adjusted.

Beneficially the device should be embodied as a manual device, preferably driven by a battery.

BRIEF DESCRIPTION OF THE DRAWINGS

In the following, a preferred exemplary embodiment of the invention is explained in greater detail based on the attached drawings. Here it shows.

DETAILED DESCRIPTION

The preferred embodiment of the compression wave massage device 1 shown in the figures comprises an oblong housing 2 with a first end section 2*a*, an opposite second end section 2*b*, and a central section 2*c* located therebetween. Preferably the housing is made from plastic. As discernible from the FIGS. 1 to 3, in the exemplary embodiment shown the two end sections 2*a* and 2*b* are rounded and taper slightly towards the central section 2*c*, which is embodied slightly narrower. At the first end section 2*a* of the housing 2 a projection 4 is formed, protruding perpendicular in reference to the longitudinal extension of the housing 2 and forming together with the first end section 2*a* of the housing 2 a head of the compression wave massage device 1, while the second end section 2*b* of the housing 2 preferably serving as the handle in order to hold the compression wave massage device 1 during application, described in greater detail in the following.

Figure 1:
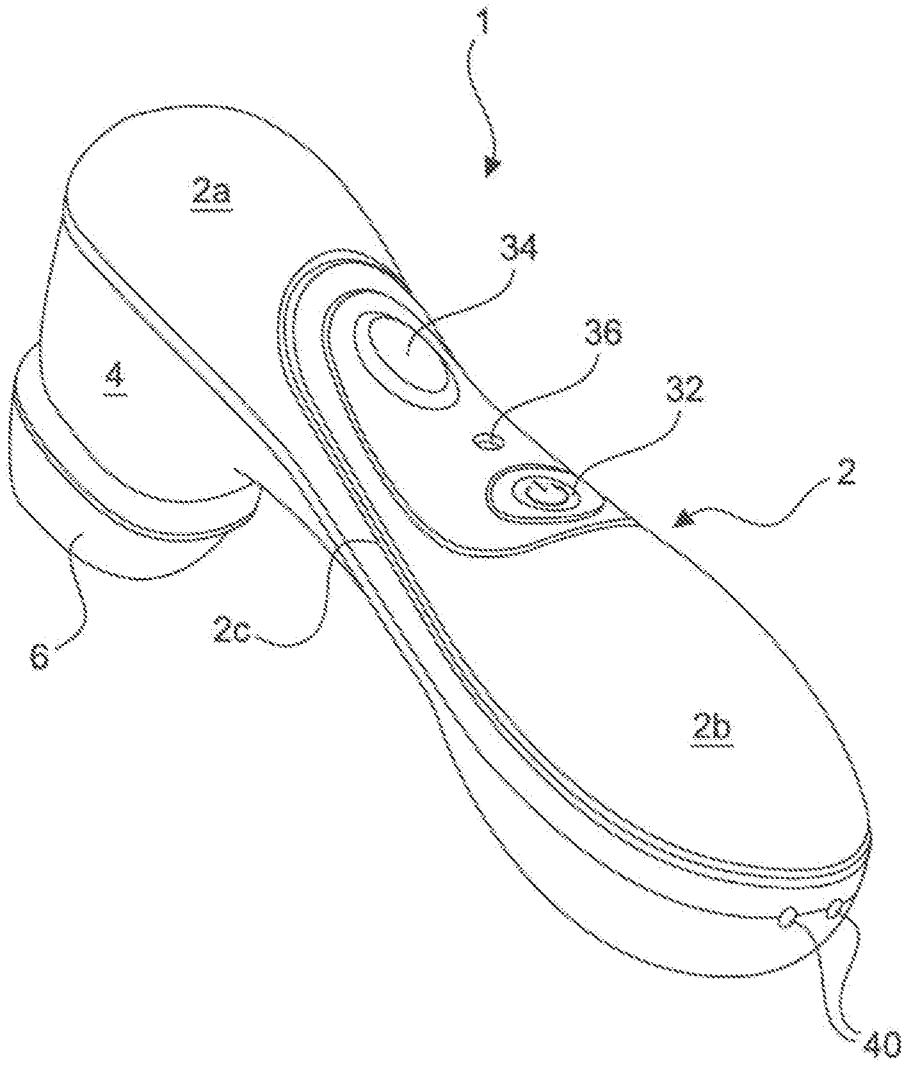
FIG. 1 is a perspective side view of the compression wave massage device according to the invention in a preferred embodiment.

As further discernible from FIG. 1, in the direction of its longitudinal extension the housing 2 is composed of two half shells, with one of the half shells being provided with the above-mentioned projection 4. The two half shells of the housing 2, not marked in greater detail in the figures, are preferably glued to each other; alternatively it is also possible to connect the two half shells of the housing 2 in a different way, namely for example using screws or other fastening means arranged at the interior sides.

Figure 2:
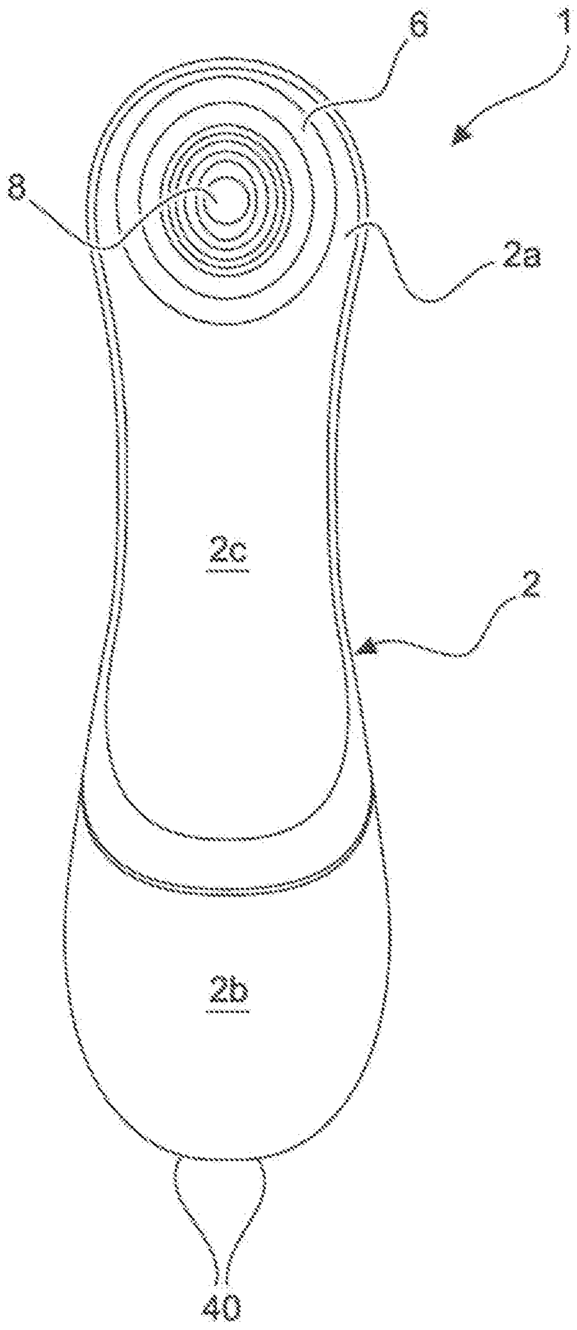
FIG. 2 is a front view of the compression wave massage device of FIG. 1.
Figure 3:
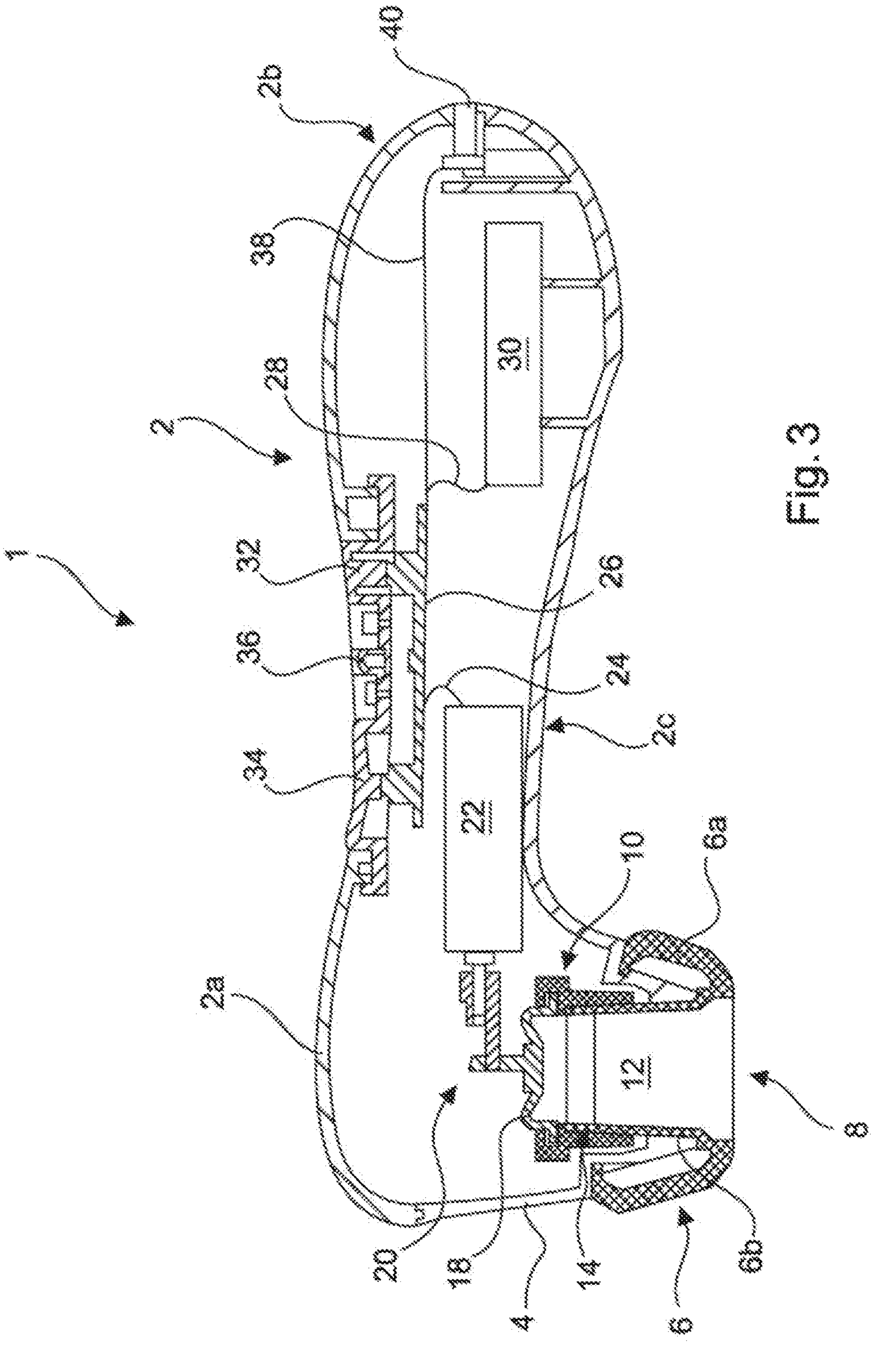
FIG. 3 is a longitudinal section through the compression wave massage device of FIG. 1.
Figure 4:
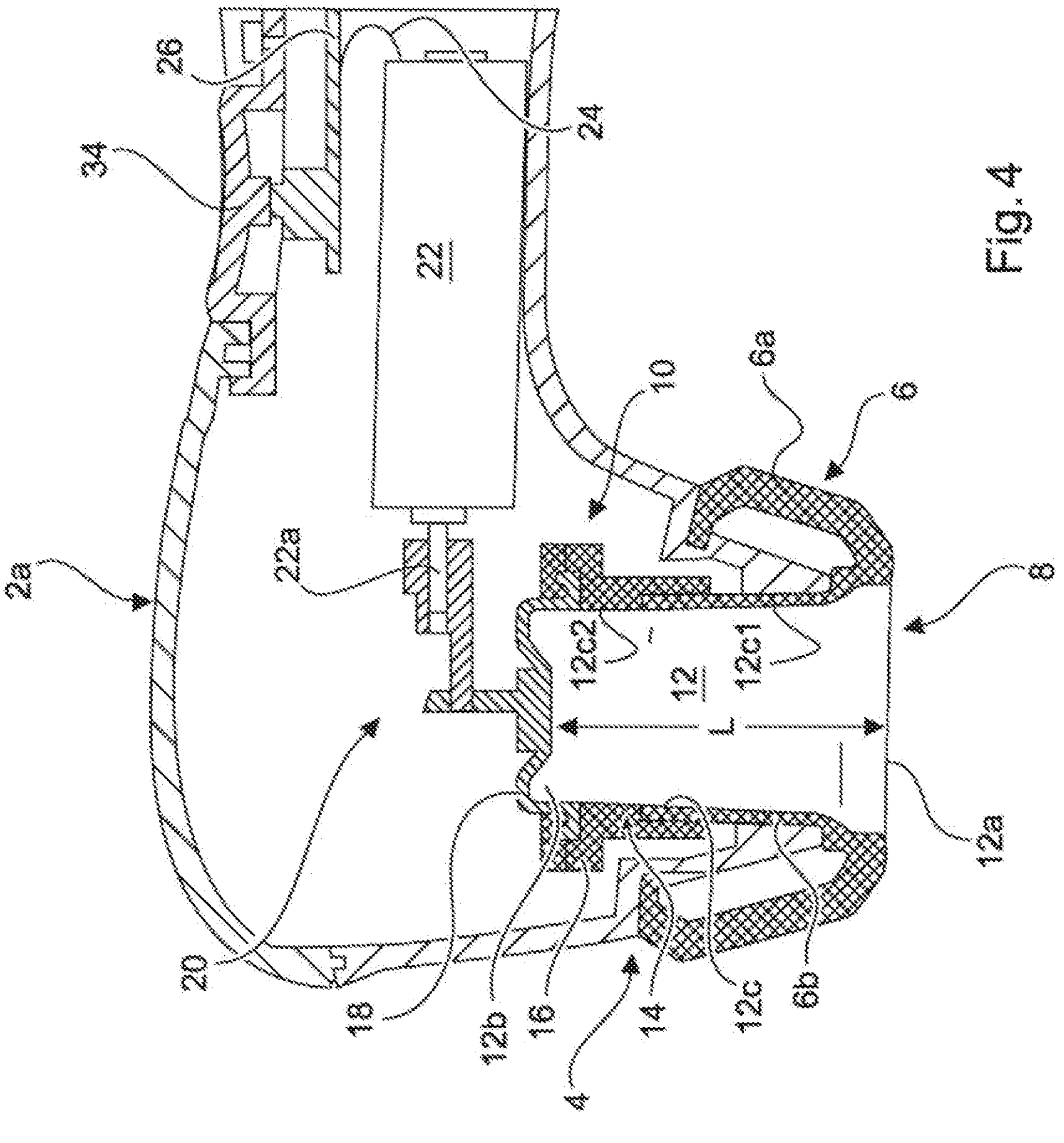
FIG. 4 is an enlarged detail of the longitudinal section of FIG. 3 in the head section of the compression wave massage device of FIG. 1.

As particularly discernible from FIGS. 1, 3, and 4, a socket 6 is located on the projection 4, which shows an opening discernible in FIGS. 2 to 4 and marked with the reference character "8". Preferably the socket 6 is made from a soft and/or flexible plastic material, such as silicon.

In the head of the compression wave massage device 1, formed by the first end section 2*a* of the housing 2 and the projection 4, a compression wave generation device 10 is located, by which a stimulating pressure field is generated with the help of the opening 8. As particularly discernible in detail from FIG. 4, the pressure field generation device 10 comprises a cavity 12 with an exterior first end 12*a* and an inner second end 4*b*, opposite the first end 12*a* and located distanced from the first end 12*a*, with the first end 4*a* simultaneously also forming the opening 8 in the socket 6. The cavity 12 is formed by a single continuous chamber 14 and is limited by an inner or lateral wall 12*c* connecting its two ends 12*a*, 12*b* to each other. As discernible from FIGS. 3 and 4, the socket shows an exterior section 6*a* by which it can be detachably fastened to the projection 4, and an inner section 6*b*, with the exterior section 6*a* and the inner section 6*b* of the socket 6 being connected to each other in the proximity of the opening 8. The inner section 6*b* of the socket 6 is formed like a sheath and limits an exterior section of the cavity 12 leading to an exterior first end 12*a*. This way, the inner wall of the sheath-shaped inner section 6*b* of the socket 6 forms simultaneously an exterior section 12*c*1 of the inner or lateral wall 12*c* of the cavity 12, leading to the opening 8. Further, in the exemplary embodiment shown the cavity 12 is limited by an interior annular element 16, with its inner wall simultaneously forming the other inner section 12_c_2 of the lateral wall 12_c_ of the cavity 12. Accordingly, in the exemplary embodiment shown the continuous single chamber 14 is composed of the sheath-shaped inner section 6_c_ of the socket 6 and the annular element 16.

Alternatively it is also possible, for example, that the annular element 16 is omitted and instead the sheath-shaped inner section 6_b_ of the socket 6 is extended to the membrane 18 and is connected to the membrane 18 to a joint, one-piece component such that the inner wall of the sheath-shaped inner section 6_b_ of the socket 6 would form in this case the entire lateral wall 12_c_ of the cavity 12.

As further discernible in FIGS. 3 and 4, the arrangement of the socket 6 and the annular element 16 is rendered such that the first section 12_c_1 of the cavity 12 is aligned to the second section 12_c_2 of the cavity 12 such that the lateral wall 12_c_ of the cavity 12 is free from any discontinuities. The cavity 12 of the chamber 14 essentially shows the form of a rotary body with a circular cross-section, with the cross-section of the cavity 12, defined perpendicular to its length L between the two ends 12_a_, 12_b_, in the exemplary embodiment shown essentially being almost constant over the entire length L between the two ends 12_a_, 12_b_ and only expanding slightly towards the opening 8 such that the opening cross-section of the opening 8 is almost equivalent to the cross-section of the cavity 12. Alternatively it is also possible for example to provide the cavity 12 with an elliptic cross-section. Thus, the chamber 14 shows a continuous tube with a cross-section almost identical over its entire length, with in the exemplary embodiment shown the cavity being aligned in the direction of its length L approximately perpendicular to the longitudinal extension of the housing 2.

In the exemplary embodiment shown the ratio of the width of the cavity 12, defined perpendicular to its longitudinal extension, to the length L of the cavity 12, defined in the direction of its longitudinal extension, values to approximately 0.39. However, other values are also possible for the ratio of diameter or width to length of the cavity 12 of the chamber 14 from 0.1 to 1.0.

As further discernible from FIGS. 3 and 4, the cavity 12 is closed at its inner second end 12_b_ with a flexible membrane 18, preferably produced from silicon, which extends over the entire cross-section of the cavity 12 and is driven via the mechanism 20 by a drive engine 22. Here the mechanism 20 is embodied such that the rotary motion of the output shaft 22_a_ of the drive engine 22 is converted into a reciprocal longitudinal motion, causing the membrane 18 to be set in motion perpendicular to the level stretched, alternatively in the direction towards the opening 8 and opposite thereto. This way, the volume of the cavity 12 of the chamber 14 is altered depending on the rotation of the output shaft 22_a_ of the drive engine 22. Preferably the mechanism 20 shows an eccentric or a con rod in order to convert the rotary motion of the output shaft 22_a_ of the drive engine 22 into a reciprocal longitudinal motion for the reciprocal deflection of the membrane 18. In general, other forms of drives are also possible, which cause a deflection of the membrane 18 for changing the volume of the cavity 12. The reciprocal motion of the membrane 18 causes thereby a change of the volume of the cavity 12 between a minimal volume and a maximal volume such that a stimulating pressure field is generated in the opening 8. This can occur for example also in an electromagnetic, piezo-electric, pneumatic, or hydraulic fashion. However the arrangement must be made such that the ratio of the volume change to the minimal volume is not below 1/10 and preferably not below 1/8, so that the ratio of minimal volume to volume change is not exceeding 10, and preferably not exceeding 8, because otherwise during the motion of the membrane 18 in the direction away from the opening 8 the suction effect becomes too low. Further, preferably the arrangement should also be rendered such that the ratio of volume change to minimal volume is not greater than 1, and preferably not exceeding ½ so that the ratio of minimal volume to volume change is not below 1 and preferably not below 2, because otherwise on the one hand the power requirement of the drive engine 22 becomes excessive and on the other hand excessive vacuum develops during the motion of the membrane 18 in the direction away from the opening 8. This way, with the help of the flexible membrane 18 driven by the drive engine 22 alternating vacuum and overpressure stages are generated in the cavity 12 of the chamber 14.

The volume of the cavity 12 is defined as the volume of the chamber 14 which ends in the proximity of the opening 8 at a virtual planar area, which virtually closes the opening 8 when the membrane 18 is in its normal and/or middle position. The minimal volume of the cavity 12 is defined such that the opening 8 of the cavity 12 is virtually closed with a planar area and the membrane 18 is in a position with the shortest distance from the opening 8 and thus in its maximally deflected state in the direction towards the opening 8. The maximal volume of the cavity 12 is defined here such that the opening 8 of the cavity 12 is virtually closed with a planar area and the membrane 18 is in a position with the greatest distance from the opening 8 and thus at a stage maximally deflected away from the opening 8.

As further discernible from FIGS. 3 and 4, the drive engine 22, which in the described exemplary embodiment represents an electric motor, is connected via an electric cable 24 to an electric control circuit board 26, controlling the drive engine 22. As further discernible from FIG. 3, via an electric cable 28 a batter 30 is connected to the control circuit board 26, which provides the drive engine 22 and the control circuit board 26 with the required electric power. The battery 30 may optionally represent a battery that cannot be recharged or also a rechargeable accumulator. While in the exemplary embodiment shown the drive engine 22 is arranged in the connection area between the narrow central section 2_c_ of the housing 2 and the first end section 2_a_ of the housing 2 and thus adjacent to the head of the compression wave massage device 1 formed by the first end section 2_a_ of the housing 2 and the projection 4, the battery 30 is arranged in the second end section 2_b_ of the housing 2, resulting in the housing 2 being well balanced when the compression wave massage device 1 is held manually by the user.

As further discernible from FIGS. 1 and 3, a power switch 32 is provided, with can be operated from the outside of the housing 2 to switch the compression wave massage device 1 on or off and is arranged in the narrow central section 2_c_ of the housing 2. A sensor 34 is also arranged in the narrow, central section 2_c_ of the housing 2, to be operated from the outside, by which the various operating conditions of the compression wave massage device 1 can be adjusted, and a control light 36 is arranged there, preferably embodied as a light diode visible from the outside. The power switch 32 and the sensor 34 are arranged directly on the control circuit board 26 fastened below the wall of the housing 2, while the control light 36 is connected via an electric cable, not shown in the figures, to the control circuit board 26.

In addition to the control of the drive engine 22, in the exemplary embodiment shown, the electric control circuit board 26 also assumes the charge management of the battery 30. For this purpose, the control circuit board 26 is connected via an electric cable 38 to the charge contacts 40 arranged at the face of the second end section 2*b* of the housing 2 and accessible from the outside, as discernible from FIGS. 1 to 3. An external charging device, not shown in the figures, can be connected to these connections 40 via a plug with magnetic plug-in contacts, which can be made to contact the connection contacts 40 to establish an electric connection based on magnetic forces.

Figure 5:
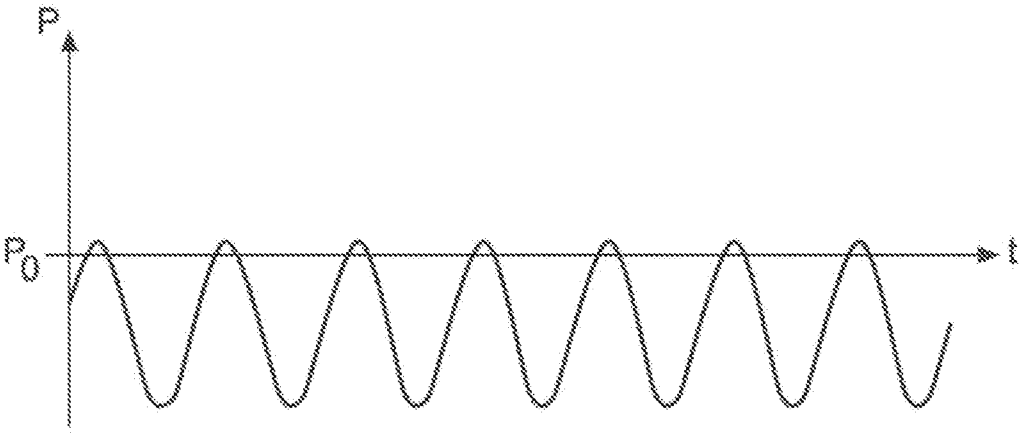
FIG. 5 is a compression wave progression preferably generated by the compression wave massage device of FIG. 1.

The compression wave massage device 1 described is embodied as a hand-held device and for the application it is placed with the socket 6 onto a body part to be stimulated, not shown in the figures, such that in the proximity of the opening 8 of the socket 6 it is essentially surrounded. During operation of the compression wave massage device 1 then the body part to be stimulated is alternating subjected to different air pressures caused by the reciprocal motion of the membrane 18. Under normal application conditions, when no excessive pressures are applied after the placement of the compression wave massage device 1 with its socket 6 on the body part to be stimulated, relative pressures perhaps can largely dissipate which arise during the respective motion of the membrane 18 in the direction towards the opening 8 so that therefore essentially the pattern develops shown in FIG. 5 of a modulated relative vacuum in reference to the normal air pressure $P_0$. However, as discernible from the pressure progression of FIG. 5, here relative overpressures can occur in the maximum in reference to normal pressure $P_0$, which are considerably lower than the minima of the relative vacuum. Usually the value of the relative overpressure in reference to the normal pressure $P_0$ amounts to no more than 10% of the value of the relative vacuum in reference to the normal pressure $P_0$. Alternatively it is also possible that the pressure field only comprises a pattern of relative vacuum conditions, which are modulated on the normal pressure $P_0$ (quasi from the bottom). In particular when the mechanism 20 comprises an eccentric, the sinusoidal periodic pressure progression develops shown in FIG. 5.

Due to the fact that the cross-section of the cavity 12 of the chamber 14, as already described, is essentially almost constant over the entire length L, this results during operation in the air flow over the entire length L of the cavity 12 essentially remaining constant as well. This way a particularly effective air flow can be generated for an effective stimulation of the body part to be stimulated with relatively low energy consumption of the drive engine 22.

The control circuit board 26 preferably shows a memory, not shown in the figures, in which various modulation patterns are saved. By an appropriate operation of the sensor 34, here a desired modulation pattern can be selected in order to control the drive engine 22 accordingly.

The invention claimed is:

1. A compression wave massage device for body parts, comprising:

a pressure field generation device consisting essentially of a flexible membrane and one continuous chamber, wherein the one continuous chamber includes one cavity having (i) a volume, (ii) a first end including an opening configurable for physical placement over a body part, and (iii) a second end, located opposite the first end and distanced therefrom, and wherein portions of the flexible membrane are physically attached and fixed to the one cavity at the second end to close the one cavity at the second end, wherein a cross-section of the one cavity is approximately constant from the first end to the second end; and a drive device including a motor, physically coupled to the flexible membrane, to, in operation, deflect the flexible membrane in a reciprocal motion in a direction towards the first end of the one cavity and away from the first end of the one cavity to thereby generate a change of the volume of the one cavity of the one continuous chamber between a minimum volume and a maximum volume such that a pressure field is generated at the first end of the one cavity of the one continuous chamber, wherein: (i) a ratio of the change in volume of the one cavity of the one continuous chamber to the minimum volume is greater than 1/10, and (ii) the ratio of the change in volume of the one cavity to the minimum volume is less than 1.

2. The compression wave massage device of claim 1, wherein the approximately constant cross-section is defined perpendicular to a length of the one cavity between the first end and the second end of the one cavity.

3. The compression wave massage device of claim 1, wherein the one cavity of the one continuous chamber includes a circular or elliptic cross-section, defined perpendicular to a length of the one cavity between the first end and the second end of the one cavity.

4. The compression wave massage device of claim 1, wherein an interior wall of the one cavity of the one continuous chamber is free from discontinuations.

5. The compression wave massage device of claim 1, wherein the one cavity of the one continuous chamber includes a continuous tube shape having the cross section, defined perpendicular to a length of the one cavity between the first end and the second end of the one cavity.

6. The compression wave massage device of claim 1, wherein a ratio of a width of the one cavity of the one continuous chamber, defined perpendicular to a longitudinal extension of the one cavity, to a length of the one cavity of the one continuous chamber, defined in a direction of the longitudinal extension of the one cavity, is between 0.2 to 0.6.

7. The compression wave massage device of claim 1, wherein a ratio of a width of the one cavity of the one continuous chamber, defined perpendicular to a longitudinal extension of the one cavity, to a length of the one cavity of the one continuous chamber, defined in a direction of the longitudinal extension of the one cavity, is between 0.38 to 0.4.

8. The compression wave massage device of claim 1, further including:

a socket, having:

a shape that conforms to fit over the first end of the one cavity of the one continuous chamber, and an opening configurable for physical placement on the body part, wherein a cross-sectional width of the opening of the socket is different from a cross-sectional width of the opening of the first end of the one cavity of the one continuous chamber, wherein the cross-sectional width of the opening of the socket is greater than the cross-sectional width of the opening of the first end of the one cavity of the one continuous chamber.

9. The compression wave massage device of claim 8, further including:

a housing, wherein:

the drive device and the pressure field generation device are disposed within the housing, and the socket is configured to (i) physically engage with the housing and (ii) is detachable from the housing.

10. The compression wave massage device of claim 9, wherein the socket is a silicone.

11. The compression wave massage device of claim 1, further including:

a housing, wherein the drive device and the pressure field generation device are disposed within the housing; and a socket, physically connected to the housing and having a shape that conforms to fit over the first end of the one cavity of the one continuous chamber and extends into the one continuous chamber to form a section of an inner lateral wall of the one cavity of the one continuous chamber, wherein the socket is separate and spaced apart from the flexible membrane.

12. The compression wave massage device of claim 1, wherein a ratio of a width of the one cavity of the one continuous chamber, defined perpendicular to a longitudinal extension of the one cavity, to a length of the one cavity of the one continuous chamber, defined in a direction of the longitudinal extension of the one cavity, is between 0.1 to 1.

13. The compression wave massage device of claim 1, wherein the flexible membrane is made from silicone.

14. A compression wave massage device for body parts, comprising:

a pressure field generation device consisting essentially of a flexible membrane and one continuous chamber, wherein the one continuous chamber includes one cavity having (i) a volume, (ii) a first end including an opening configurable for physical placement over a body part, and (iii) a second end, located opposite the first end and distanced therefrom, and wherein portions of the flexible membrane are physically attached and fixed to the one cavity at the second end to close the one cavity at the second end, wherein a cross-section of the one cavity is approximately constant from the first end to the second end;

a drive device including a motor, physically coupled to the flexible membrane, to, in operation, deflect the flexible membrane in a reciprocal motion in a direction towards the first end of the one cavity and away from the first end of the one cavity to thereby generate a change of the volume of the one cavity of the one continuous chamber between a minimum volume and a maximum volume such that a pressure field is generated at the first end of the one cavity of the one continuous chamber, wherein: (i) a ratio of the change in volume of the one cavity of the one continuous chamber to the minimum volume is greater than $1/10$, and (ii) the ratio of the change in volume of the one cavity to the minimum volume is less than 1;

a housing, wherein the drive device and the pressure field generation device are disposed within the housing; and a socket, physically engaged within the housing and having a shape that conforms to fit over the first end of the one cavity of the one continuous chamber to attach to an exterior surface of the housing and extends into the one continuous chamber to form a section of an inner lateral wall of the one cavity of the one continuous chamber.

15. The compression wave massage device of claim 14, wherein the socket is made from a soft, flexible material.

16. The compression wave massage device of claim 14, wherein:

the housing includes a channel formed in an external surface thereof and spaced apart from the first end of the one cavity of the one continuous chamber; and the socket includes a portion that is disposed on an exterior of the housing and a projection that engages and fits in the channel of the housing to secure the socket to the housing, wherein the socket is detachable from the housing by removing the projection from the channel of the housing and wherein the socket is separate and spaced apart from the flexible membrane, wherein the socket is detachable from the housing by removing the projection from the channel of the housing and wherein the socket is separate and spaced apart from the flexible membrane.

17. A compression wave massage device for body parts, comprising:

a pressure field generation device consisting essentially of a flexible membrane and one continuous chamber, wherein the one continuous chamber includes a cavity having (i) a volume, (ii) a first end including an opening configurable for physical placement over a body part, and (iii) a second end, located opposite the first end and distanced therefrom, and wherein portions of the flexible membrane are physically attached and fixed to the cavity at the second end to close the cavity at the second end, wherein a cross-section of the cavity is approximately constant from the first end to the second end;

a drive device including a motor, physically coupled to the flexible membrane, to, in operation, deflect the flexible membrane in a reciprocal motion in a direction towards the first end of the cavity and away from the first end of the cavity to thereby generate a change of the volume of the cavity of the one continuous chamber between a minimum volume and a maximum volume such that a pressure field is generated at the first end of the cavity of the one continuous chamber, wherein: (i) a ratio of the change in volume of the cavity of the one continuous chamber to the minimum volume is greater than $1/10$, and (ii) the ratio of the change in volume of the cavity to the minimum volume is less than 1;

a housing, wherein the drive device and the pressure field generation device are disposed within the housing;

wherein, in operation, the pressure field generation device and the drive device cooperate to provide a pressure field having a pattern of relative vacuum stages and relative overpressure stages which are modulated on a reference pressure, wherein a maximum pressure of each relative overpressure stage in reference to normal air pressure is below a value of a relative vacuum in reference to the normal air pressure.

18. The compression wave massage device of claim 17, wherein the maximum pressure of each relative overpressure stage in reference to the normal air pressure is less than or equal to 10% of the value of the relative vacuum in reference to the normal air pressure.

19. The compression wave massage device of claim 17, wherein the pressure field is a sinusoidal periodic pressure progression.

20. The compression wave massage device of claim 17, further including:

a socket, physically connected to the housing and having a shape that conforms to fit over the first end of the cavity of the one continuous chamber and extends into the one continuous chamber to form a section of an inner lateral wall of the cavity of the one continuous chamber and wherein the socket is separate and spaced apart from the flexible membrane.

21. The compression wave massage device of claim 20, wherein:

the housing includes a channel formed in an external surface thereof and spaced apart from the first end of the cavity of the one continuous chamber; and the socket includes a portion that is disposed on an exterior of the housing and a projection that fits in the channel of the housing to secure the socket to the housing.

* * * * *